United States Patent
She et al.

(10) Patent No.: US 8,009,754 B2
(45) Date of Patent: Aug. 30, 2011

(54) WIRELESS COMMUNICATION METHOD, RADIO RECEIVING APPARATUS, RADIO TRANSMITTING APPARATUS, AND WIRELESS COMMUNICATION SYSTEM

(75) Inventors: Xiaoming She, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1084 days.

(21) Appl. No.: 11/813,647

(22) PCT Filed: Jan. 12, 2006

(86) PCT No.: PCT/JP2006/300292
§ 371 (c)(1),
(2), (4) Date: Jul. 10, 2007

(87) PCT Pub. No.: WO2006/075661
PCT Pub. Date: Jul. 20, 2006

(65) Prior Publication Data
US 2009/0190684 A1    Jul. 30, 2009

(30) Foreign Application Priority Data
Jan. 13, 2005    (CN) .......................... 2005 1 0004365

(51) Int. Cl.
H04B 7/02 (2006.01)
H04L 1/02 (2006.01)
H04K 1/10 (2006.01)
H04L 5/12 (2006.01)

(52) U.S. Cl. ....................................... 375/267; 375/260
(58) Field of Classification Search .................. 375/267
See application file for complete search history.

(56) References Cited

U.S. PATENT DOCUMENTS

| 6,236,740 | B1 * | 5/2001 | Lee | 382/119 |
| 6,763,073 | B2 * | 7/2004 | Foschini et al. | 375/260 |
| 2002/0136287 | A1 * | 9/2002 | Heath et al. | 375/228 |
| 2003/0228850 | A1 * | 12/2003 | Hwang | 455/101 |
| 2004/0013212 | A1 * | 1/2004 | Benesty et al. | 375/347 |
| 2004/0029533 | A1 | 2/2004 | Matsuo et al. | |

(Continued)

FOREIGN PATENT DOCUMENTS

CN    1476270    2/2004
(Continued)

OTHER PUBLICATIONS

PCT International Search Report dated Apr. 18, 2006. D. Gore, et al.; "Space-time block coding with optimal antenna selection," In: Acoustics, Speech, and Signal Processing, 2001 IEEE International Conference on May 11, 2001, vol. 4, pp. 2441-2444.

*Primary Examiner* — Dac V Ha
*Assistant Examiner* — Erin M File
(74) *Attorney, Agent, or Firm* — Dickinson Wright PLLC

(57) ABSTRACT

A wireless communication system capable of achieving adaptive STTD (Space-time Transmit Diversity). In this system, a receiving apparatus uses a channel estimation to calculate SINR (Signal to Interference and Noise Ratio) of each of substreams in all the combinations of transmission antennas and also calculate the performance of the whole system in all the combinations of transmission antennas, thereby deciding a particular combination, which provides the best performance of the whole system, and obtaining a parameter for antenna selection. The SINR of each substream in the decided particular combination is used to decide an AMC parameter. A transmitting apparatus performs STTD and AMC based on the AMC parameter fed back from the receiving apparatus, and further selects, based on the antenna selection parameter fed back from the receiving apparatus, a particular combination of transmission antennas for performing a transmission.

14 Claims, 6 Drawing Sheets

U.S. PATENT DOCUMENTS

| | | | |
|---|---|---|---|
| 2004/0165558 A1* | 8/2004 | Ling et al. | 370/334 |
| 2004/0204104 A1 | 10/2004 | Horng et al. | |
| 2005/0129137 A1* | 6/2005 | Yamada et al. | 375/267 |
| 2005/0250544 A1* | 11/2005 | Grant et al. | 455/562.1 |
| 2006/0034163 A1* | 2/2006 | Gore et al. | 370/208 |
| 2009/0022239 A1* | 1/2009 | Kimura et al. | 375/267 |

FOREIGN PATENT DOCUMENTS

| | | |
|---|---|---|
| CN | 1499867 | 5/2004 |
| JP | 2003332955 | 11/2003 |
| JP | 2004194262 | 7/2004 |
| WO | 2004014013 | 12/2004 |

* cited by examiner

| RANK M | CODING PARAMETER | MODULATION PARAMETER | THROUGHPUT T(bps/Hz) |
|---|---|---|---|
| 0 | DO NOT TRANSMIT | DO NOT TRANSMIT | 0 |
| 1 | 1/2Turbo | BPSK | 0.5 |
| 2 | 1/2Turbo | QPSK | 1 |
| 3 | 3/4Turbo | QPSK | 1.5 |
| 4 | 2/3Turbo | 8PSK | 2 |
| 5 | 3/4Turbo | 16QAM | 3 |
| 6 | 2/3Turbo | 64QAM | 4 |

FIG.4

WIRELESS COMMUNICATION METHOD, RADIO RECEIVING APPARATUS, RADIO TRANSMITTING APPARATUS, AND WIRELESS COMMUNICATION SYSTEM

TECHNICAL FIELD

The present invention relates to a radio communication method, radio receiving apparatus, radio transmitting apparatus and radio communication system for performing communication using a plurality of antennas.

BACKGROUND ART

A MIMO (Multiple-Input Multiple-Output) system realizes high quality and high-speed transmission by effectively using a limited frequency band and is recently focused. The MIMO system simultaneously transmits/receives independent signals in the same band through a plurality of eigenvectors using a plurality of antennas for both transmission and reception. Compared with a single antenna system, the MIMO system can expand the transmission communication capacity without expanding the frequency band by using a plurality of antennas so that it is possible to improve the transmission rate.

A technology introducing STTD (Space-Time Transmit Diversity) to a system applying MIMO is proposed so that it is possible to further improve the transmission rate of a radio communication system applying a MIMO technology. STTD is a technique for obtaining not only a temporal diversity gain but also a spatial diversity gain using two antennas by encoding between symbols transmitted through the corresponding antennas. The proposed technology incorporates the STTD technology into a system using four transmit antennas and has a configuration called a "DSTTD (Double-STTD) configuration."

A DSTTD-SGRC (DSTTD-Sub-Group Rate Control) which introduces AMC into DSTTD is proposed so that it is possible to further improve the throughput of the system adopting the above DSTTD configuration. The AMC technology changes a modulation scheme or a channel coding rate adaptively and quickly. For example, it is possible to improve the transmission rate and improve the throughput of the system by using a faster modulation scheme and increasing a channel coding rate in a better propagation environment.

At present, DSTTD and DSTTD-SGRC technologies are already 3GPP (3rd Generation Partner Project) standards and are highly likely to be adopted for systems applying MIMO in the future. That is, it is possible to realize adaptive time-space diversity by simultaneously applying the STTD technology and AMC technology to a MIMO system.

MEANS FOR SOLVING THE PROBLEM

The channel configured by a plurality of antennas change every moment in the above described DSTTD and DSTTD-SGRC radio communication systems so that it is possible to further improve the overall system performance by taking channel changes into consideration.

Therefore, it is an object of the present invention to provide a radio communication system, radio receiving apparatus, radio transmitting apparatus and radio communication method capable of improving the overall system performance by taking time variations of channels into consideration.

A technical concept of the present invention is as follows. The receiving side estimates time-varying channels, calculates the overall system performance in all combinations of a plurality of transmit antennas based on the channel estimation result, determines a specific combination that optimizes the overall system performance and feedbacks the determination result to the transmitting side. The transmitting side uses the determination result fed back from the receiving side, selects a specific combination of transmit antennas and transmits an STTD-coded signal using this specific combination of transmit antennas. In this way, it is possible to realize adaptive STTD according to channel variations and always maintain the system performance in an optimal condition.

For example, a first aspect of the present invention provides a radio communication system comprised of a radio transmitting apparatus for transmitting a plurality of signals using a plurality of transmit antennas and a radio receiving apparatus for receiving the plurality of signals using a plurality of receive antennas, and, in this radio communication system, the radio receiving apparatus has: a channel estimating section that performs channel estimation using the plurality of signals and generates a channel estimation matrix; a determining section that calculates an overall performance of the radio communication system in all combinations of the plurality of transmit antennas using the channel estimation matrix and determines a specific combination that optimizes the performance; and a reporting section that reports information about the specific combination to the radio transmitting apparatus, and the radio transmitting apparatus has: an antenna selecting section that selects the transmit antennas to use in transmission according to the specific combination reported from the radio receiving apparatus; and a transmitting section that transmits the plurality of signals using the selected transmit antennas.

According to the present invention, it is possible to improve overall system performance in a radio communication system by using a plurality of antennas.

BRIEF DESCRIPTION OF DRAWINGS

FIG. 4 shows a table used to obtain a throughput of each substream according to Embodiment 2 of the present invention;

BEST MODE FOR CARRYING OUT THE INVENTION

Hereinafter, embodiments of the present invention will be described in detail with reference to the attached drawings.

Embodiment 1

Figure 1:
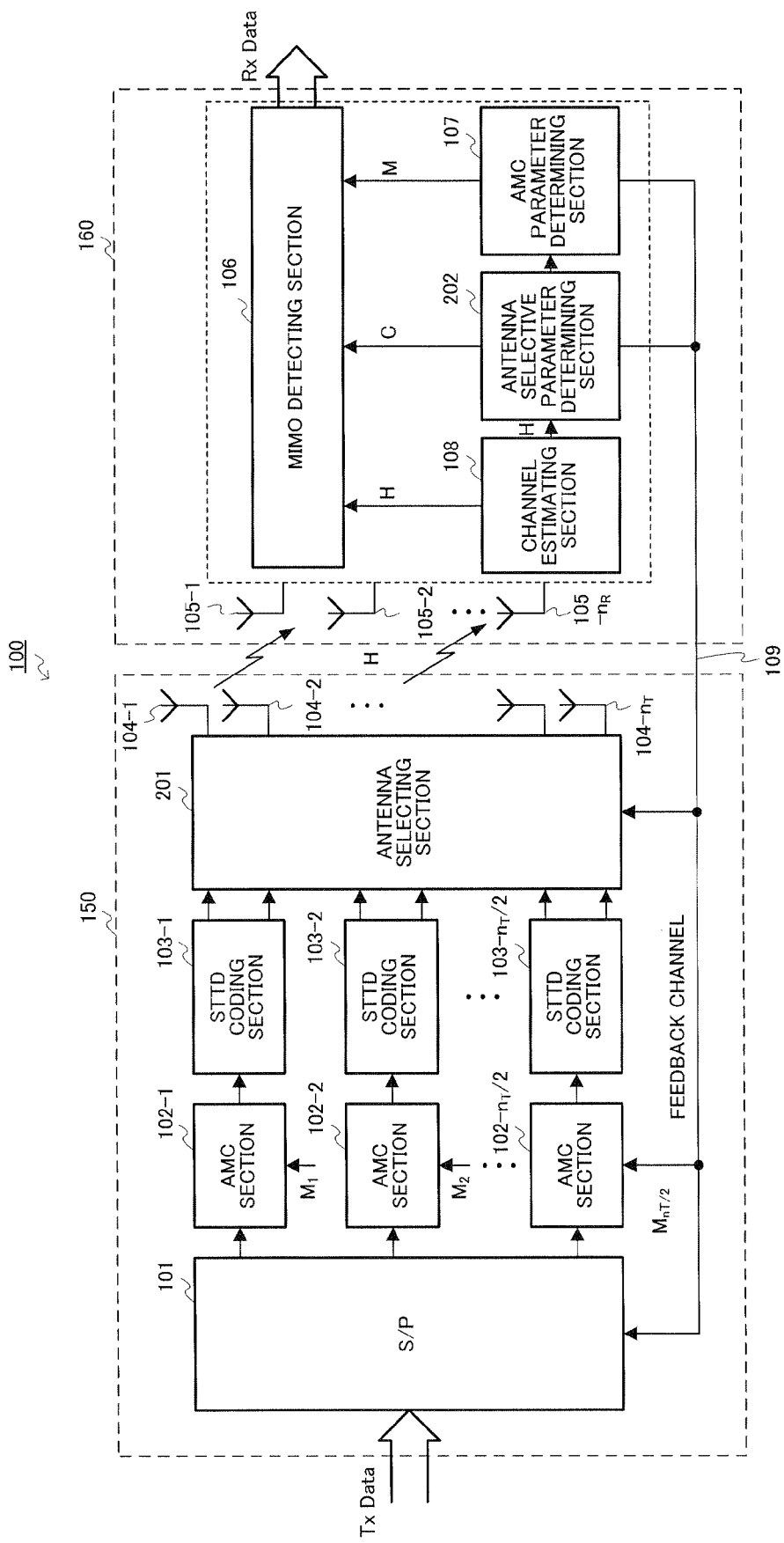
FIG. 1 is a block diagram showing the main configuration of a MIMO system according to Embodiment 1 of the present invention.

FIG. 1 is a block diagram showing the main configuration of MIMO system 100 according to Embodiment 1 of the present invention. Here, MIMO system 100 applying AMC and STTD will be described as an example of a radio communication system using a plurality of antennas.

MIMO system 100 has radio transmitting apparatus 150 and radio receiving apparatus 160. Radio transmitting apparatus 150 has S/P (serial-to-parallel) conversion section 101, AMC sections 102-1 to 102-$n_T$/2 (or referred to as "AMC section 102"), STTD coding sections 103-1 to 103-$n_T$/2 (or referred to as "STTD coding section 103"), antenna selecting section 201 and transmit antennas 104-1 to 104-$n_T$ (or referred to as "transmit antenna 104"), and radio receiving apparatus 160 has receive antennas 105-1 to 105-$n_R$ (or referred to as "receive antenna 105"), channel estimating section 108, antenna selective parameter determining section 202, AMC parameter determining section 107 and MIMO detecting section 106.

In radio transmitting apparatus 150, S/P conversion section 101 subjects inputted transmit data (Tx data) to the S/P conversion processing, generates $n_T$/2 substreams and outputs each substream to AMC sections 102-1 to 102-$n_T$/2 respectively. Hereinafter, each substream generated in S/P conversion section 101 will be referred to as "$S_1, S_2, \ldots, S_{nT/2}$" AMC sections 102-1 to 102-$n_T$/2 subjects substreams $S_1$ to $S_{nT/2}$ inputted from S/P conversion section 101 to adaptive modulation and the channel coding encoding processing (also referred to as "AMC processing") based on AMC parameters $M_1$ to $M_{nT/2}$ fed back from radio receiving apparatus 160 through feedback channel 109. STTD coding sections 103-1 to 103-$n_T$/2 performs the STTD processing on substreams $S_1$ to $Sn_T$/2 subjected to the AMC processing and inputted from AMC sections 102-1 to 102-$n_T$/2, and outputs the two signals generated to antenna selecting section 201. That is, two transmission signals are generated from one substream, and accordingly, one substream corresponds to two transmit antennas.

Antenna selecting section 201 adaptively outputs to one of transmit antennas 104-1 to 104-$n$ the signals inputted from STTD coding sections 103-1 to 103-$n_T$/2 based on antenna selective parameter C fed back from radio receiving apparatus 160 through feedback channel 109. For example, antenna selecting section 201 outputs to transmit antenna 104-5 one of the two signals inputted from STTD coding section 103-1 based on antenna selective parameter C and outputs the other to transmit antenna 104-10. That is, antenna selective parameter C indicates one of the combinations of transmit antennas 104-1 to 104-$n_{,T}$ and indicates the correspondence between the plurality of transmitted signals inputted from STTD coding sections 103-1 to 103-$n_T$/2 and the plurality of transmit antennas 104-1 to 104-$n_T$. In this way, signals subjected to STTD by STTD coding sections 103-1 to 103-$n_T$/2 are transmitted using a adaptively selected specific combination of transmit antennas, and such STTD is referred to as "adaptive STTD" here.

Receive antennas 105-1 to 105-$n_R$ in radio receiving apparatus 160 receive the signals transmitted from transmit antennas 104-1 to 104-$n_T$. Channel estimating section 108 performs channel estimation using pilot channel signals out of the signals received by receive antennas 105-1 to 105-$n_R$ or other methods, and outputs channel estimation matrix H indicating the current channel characteristic to antenna selective parameter determining section 202 and MIMO detecting section 106.

Antenna selective parameter determining section 202 obtains an SINR-(Signal to Interference and Noise Ratio)-after-STTD-decoding of each substream in all combinations of transmit antennas based on channel estimation matrix H inputted from channel estimating section 108, further determines a specific combination of transmit antennas that optimizes the overall system performance and obtains antenna selective parameter C. The determining processing of antenna selective parameter C at antenna selective parameter determining section 202 will be described in detail later. Antenna selective parameter determining section 202 outputs channel estimation matrix H or the SINR-after-STTD-decoding of each substream in all combinations of transmit antennas to AMC parameter determining section 107. Furthermore, antenna selective parameter determining section 202 outputs antenna selective parameter C to MIMO detecting section 106 for the use of next receiving processing and feeds back antenna selective parameter C to antenna selecting section 201 of radio transmitting apparatus 150 through feedback channel 109 for the use of next transmitting processing.

AMC parameter determining section 107 determines AMC parameter M using the SINR-after-STTD-decoding of each substream in all combinations of transmit antennas inputted from antenna selective parameter determining section 202. AMC parameter M is formed with AMC parameters $M_1$ to $M_{nT/2}$ used in AMC sections 102-1 to 102-$n_T$/2, and is an adaptive modulation and channel coding parameter that optimizes the system performance according to the characteristic of the channel through which substreams $S_1$ to $S_{nT/2}$ pass. The modulation scheme and an identification number indicating the coding rate may be fed back as AMC parameters $M_1$ to $M_{nT/2}$ instead of the modulation scheme and the coding rate of channel coding itself so that it is possible to reduce the consumption of feedback system resources. AMC parameter determining section 107 feeds back AMC parameter M to AMC section 102 of radio transmitting apparatus 150 through feedback channel 109 for the next transmitting processing. AMC parameter determining section 107 outputs AMC parameter M to MIMO detecting section 106 for the next receiving processing.

MIMO detecting section 106 detects, from the received signal received at receive antennas 105-1 to 105-$n_R$, Tx data inputted to radio transmitting apparatus 150 as transmit data by using antenna selective parameter C inputted from antenna selective parameter determining section 202 in the previous receiving processing and AMC parameter M inputted from AMC parameter determining section 107. To be more specific, MIMO detecting section 106 subjects the received signal received at receive antenna 105 to the spatial separation processing such as ZF (Zero Forcing) or MMSE (Minimum Mean Square Error) and detects $n_T$/2 substreams. Each detected substream is further subjected to the STTD decoding processing, demodulation, the channel coding processing and the P/S conversion processing, and data transmitted from radio transmitting apparatus 150 (that is, Rx Data) is outputted. Here, the received data is referred to as "Rx Data". The STTD decoding processing in MIMO detecting section 106 is the reverse processing of the STTD coding processing in STTD coding section 103, and adaptive demodulation and the channel decoding processing at MIMO detecting section 106 are the reverse processing of the AMC processing in AMC section 102.

Feedback channel 109 is used by antenna selective parameter determining section 202 in feeding back antenna selective parameter C to antenna selecting section 201 and is used by AMC parameter determining section 107 in feeding back AMC parameter M to AMC section 102.

Figure 2:
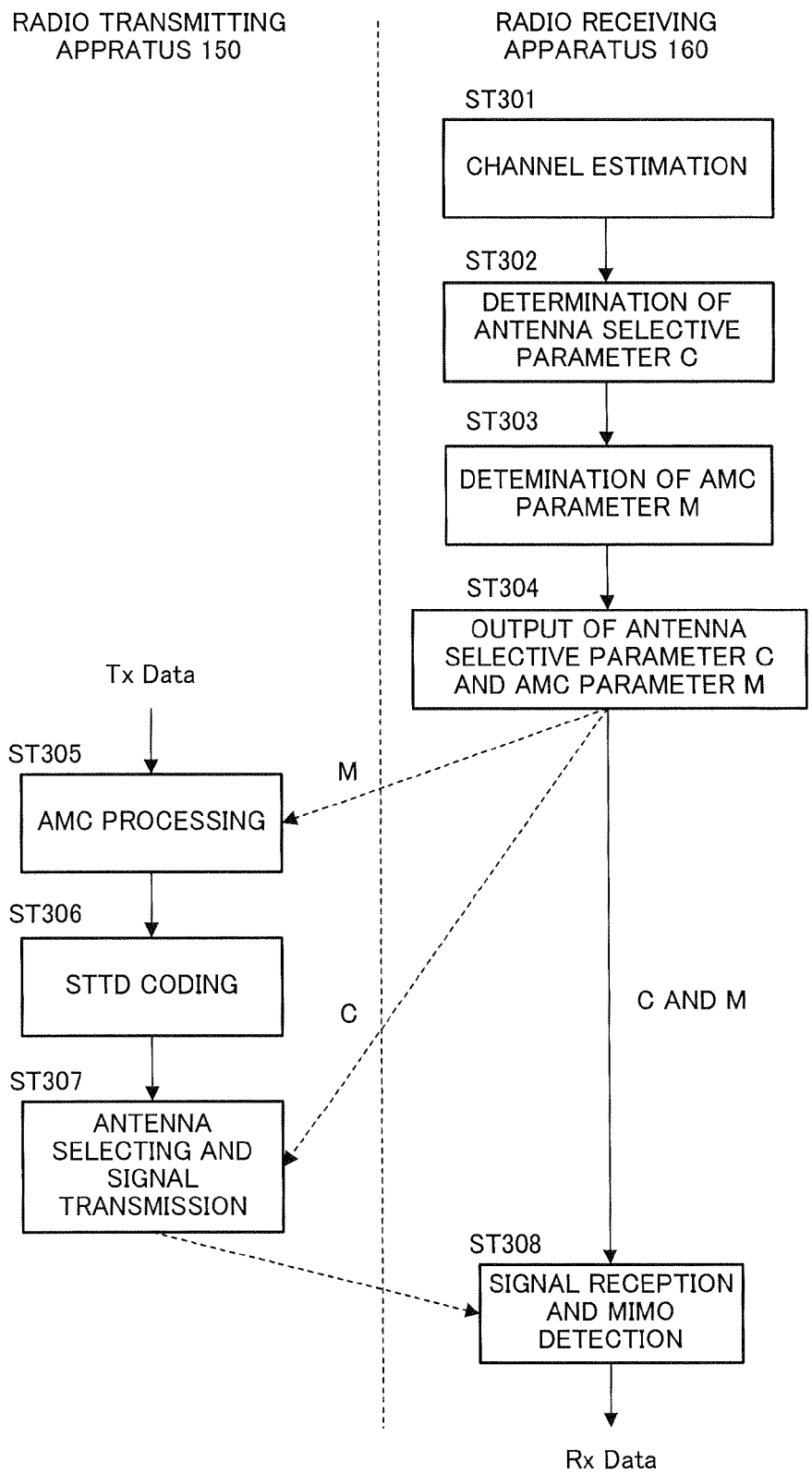
FIG. 2 is a sequence diagram showing the processing of selecting a combination of antennas in the MIMO system according to Embodiment 1 of the present invention.

FIG. 2 is a sequence diagram showing the processing of selecting a combination of antennas in MIMO system 100 according to the present embodiment. The processing shown in this sequence diagram is performed every time radio transmitting apparatus 150 performs transmission. In this figure, ST (step) 301, ST302, ST303, ST304 and ST308 show the operations of radio receiving apparatus 160, and ST305, ST306 and ST307 show the operations of radio transmitting apparatus 150.

First, channel estimating section 108 performs channel estimation and obtains channel estimation matrix H (ST301). Next, antenna selective parameter determining section 202 performs the antenna selective parameter determining processing and determines antenna selective parameter C (ST302). Next, AMC parameter determining section 107 determines AMC parameter M (ST303). Next, antenna selective parameter determining section 202 outputs antenna selective parameter C to MIMO detecting section 106, and AMC parameter determining section 107 outputs AMC parameter M to MIMO detecting section 106 (ST304). Furthermore, in ST304, antenna selective parameter determining section 202 feeds back antenna selective parameter C to antenna selecting section 201 of radio transmitting apparatus 150, and AMC parameter determining section 107 feeds back AMC parameter M to AMC section 102. Next, AMC section 102 subjects to the AMC processing transmit data Tx data inputted to radio transmitting apparatus 150 by using AMC parameter M fed back from AMC parameter determining section 107 to (ST305). Next, STTD coding section 103 performs the STTD coding processing (ST306). Next, antenna selecting section 201 performs antenna selection and transmits a transmitted signal by using antenna selective parameter C fed back from antenna selective parameter determining section 202 (ST307). Next, in radio receiving apparatus 160 which received the signal transmitted from radio transmitting apparatus 150, MIMO detecting section 106 detects each substream using AMC parameter M and antenna selective parameter C, performs the STTD decoding processing, demodulating processing, channel decoding processing and P/S processing, and obtains and outputs received data Rx Data (ST308).

Figure 3:
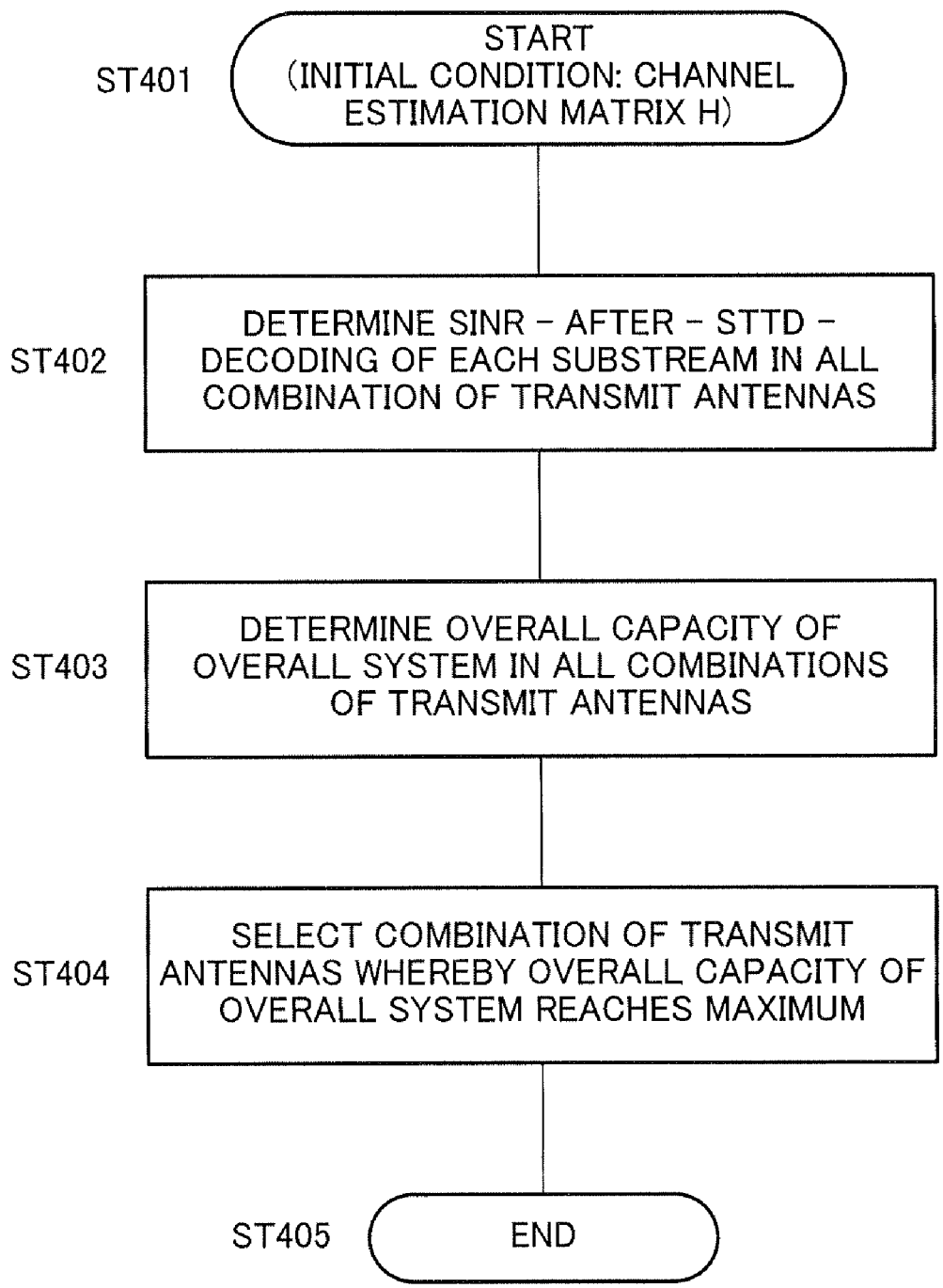
FIG. 3 is a flowchart showing a step of the processing of determining antenna selective parameters according to Embodiment 1 of the present invention.

FIG. 3 is a flow chart showing the step of processing of determining antenna selective parameter C in antenna selective parameter determining section 202. This flow chart shows more detailed processing of ST302 shown in FIG. 2.

The present embodiment shows the processing of selecting a combination of a plurality of transmit antennas according to the condition of a communication channel so that it is possible to realize adaptive STTD. When the number of a plurality of transmit antennas is $n_T$, the total number of possible combinations of these transmit antennas 104-1 to 104-$n_T$ is K represented by following equation 1 and combinations will be expressed as $C_1, C_2, \ldots, C_K$.

(Equation 1)

$$K = \frac{n_T!}{2^{(n_T/2-1)} \cdot (n_T/2)!} \quad [1]$$

For example, where $n_T=4$ holds, the total number K of possible combinations of transmit antennas 104-1 to 104-4 is 3 and the combinations are $C_1=\{(1,2); (3,4)\}$, $C_2=((1,3);(2,4))$ and $C_3=\{(1,4); (2,3)\}$. Here $n_T=4$ holds, the number of STTD coding sections ($n_T/2$) provided in radio transmitting apparatus 150 is 2, combination $C_3=\{(1,4);(2,3)\}$ indicates that two signals outputted from STTD coding section 103-1 are transmitted through first transmit antenna 104-1 and fourth transmit antenna 104-4, and two signals outputted from STTD coding section 103-2 are transmitted through transmit antenna 104-2 and transmit antenna 104-3. Two antennas which transmit two signals outputted from the same STTD coding section such as (1,4) or (2,3) are referred to as "one set." Here, once one set of antennas is determined, the correspondence between these two signals and two antennas constituting this one set need not be considered. That is, equation where (1,4)=(4,1) holds. When all sets of antennas are determined, the correspondence between STTD coding sections and sets of antennas does not influence the overall system performance, and therefore need not be considered. That is, equation where $C_3=\{(1,4);(2,3)\}=\{(2,3);(1,4)\}$ also holds.

First, ST401 shows the start of the processing of determining antenna selective parameter C and channel estimation matrix H is known as the initial condition of this processing. That is, channel estimation matrix H is obtained through the estimating processing by channel estimating section 108 before the processing of determining antenna selective parameter C is performed.

Next, in ST402, antenna selective parameter determining section 202 determines the SINR(i,j)-after-STTD-decoding of each substream in all combinations of transmit antennas. Here, the first element "i" (i=1, 2, ..., K) of SINR(i,j) is the combination number of transmit antennas and the second element "j" is the number of each substream. Because a change of a combination of transmit antennas can be represented by a corresponding column transformation (substitution between columns) of channel estimation matrix H, thus and the SINR-after-STTD-decoding of each substream in all combinations of transmitting antennas is determined when, the SINR-after-STTD-decoding of each substream corresponding to all column transformation of channel estimation matrix H is determined, in other words, when column transformation of the SINR-after-STTD-decoding of each substream corresponding to channel estimation matrix H is determined. To be more specific, this will be described as follows. For example, when a combination of transmit antennas corresponding to channel estimation matrix H is $C_3$, the SINR-after-STTD-decoding of each substream for combination $C_3$ is represented by the SINR (3,j) (j=1, 2, ..., $n_T/2$). Next, combination $C_1$ is column transformation of combination $C_3$ so that it is possible to obtain the SINR (1, j) corresponding to $C_1$ by subjecting the SINR (3,j) corresponding to $C_3$ to the same column transformation. Likewise, it is possible to obtain the SINR (i,j) corresponding to all combinations $C_1$ to $C_K$ by subjecting the SINR (3,j) to column transformation.

In order to determine the above described SINR (3,j), an SINR-before-STTD-decoding (referred to as SINR' (3,j) here) of each substream needs to be obtained, and an SINR' (3,j) is an SINR obtained for each substream separated through the spatial separation processing of, for example, ZF or MMSE in MIMO detecting section 106. When the SINR' (3,j) is obtained, the SINR (3,j) can be obtained by adding an STTD coding gain to the SINR' (3,j). That is, when the STTD coding gain is G, SINR (3,j)=G*SINR' (3,j).

Next, in ST403, antenna selective parameter determining section 202 obtains the overall system performance in all combinations of transmit antennas using the SINR (i, j) (here i=1, 2, ..., K, j=1, 2, ..., $n_T/2$) obtained in ST402. Here, overall communication capacity of the overall system is obtained as the overall system performance. Overall communication capacity $R_i$ (here i=1, 2, ..., K) of the overall system in all combinations of transmit antennas is calculated using, for example, following equation 2.

(Equation 2)

$$R_i \sum_{j=1}^{n_T/2} \log_2(1 + SINR(i, j)) \quad i = 1, 2, \ldots, K \qquad [2]$$

As shown in equation 2, overall communication capacity $R_i$ of the overall system is the sum total of the communication capacity of each stream for combination $C_i$ of transmit antennas, and can be obtained according to Shannon's formula using the SINR-(i, j)-after-STTD-decoding of streams for each combination of transmit antennas.

Next, in ST404, i that maximizes overall communication capacity $R_i$ of the overall system is selected and determined as antenna selective parameter C.

Next, ST405 indicates the end of the processing of determining the antenna selective parameter in antenna selective parameter determining section 202. Antenna selective parameter C determined in ST404 of the step of determining above described antenna selective parameter C is fed back to antenna selecting section 201 of radio transmitting apparatus 150 in the step of ST304 shown in FIG. 2.

In this way, according to the present embodiment, in a radio communication system that performs communications using a plurality of antennas, the overall system performance is optimized by selecting and determining a combination of antennas every transmission, so that it is possible to improve overall communication capacity of the radio communication system and improve the transmission rate.

Although a case has been described with the present embodiment as an example where an SINR is used in the processing of determining antenna selective parameter C, an SNR (Signal to Noise Ratio) may be used.

Furthermore, although a case has been described with the present embodiment as an example where one substream is transmitted in association with two transmit antennas, the present invention is not limited to this and one substream may be transmitted in association with two or more transmit antennas.

Embodiment 2

The present embodiment is basically the same as Embodiment 1 yet is unique in, in the processing of determining antenna selective parameter C in antenna selective parameter determining section 202, using the actual throughput of the overall system instead of using overall communication capacity of the overall system determined according to Shannon's formula as the overall system performance. That is, the present embodiment performs the same processing other than the processing in ST403 and ST404 in the flow chart of FIG. 3 in Embodiment 1, and the same processing other than the processing in ST403 and ST404 will be omitted here.

FIG. 4 shows a table used in determining throughput of each substream. This table shows a combination of a plurality of modulation schemes and channel coding rates, the first column shows rank M assigned to such a combination, the second column shows an channel coding parameter and the third column shows a modulation parameter. The fourth column shows indicates a throughput of a substream when actually subjecting the substream to the AMC processing and performing communication using a combination of the channel coding rate indicated by the second column and the modulation scheme indicated by the third column on the same row. Here, a parameter "not transmitted" corresponding to $M_j=0$ (j=0, 1, . . . , $n_T/2$) indicates that data is not transmitted using substream $S_j$. Therefore, corresponding throughput T is 0.

Figure 5:
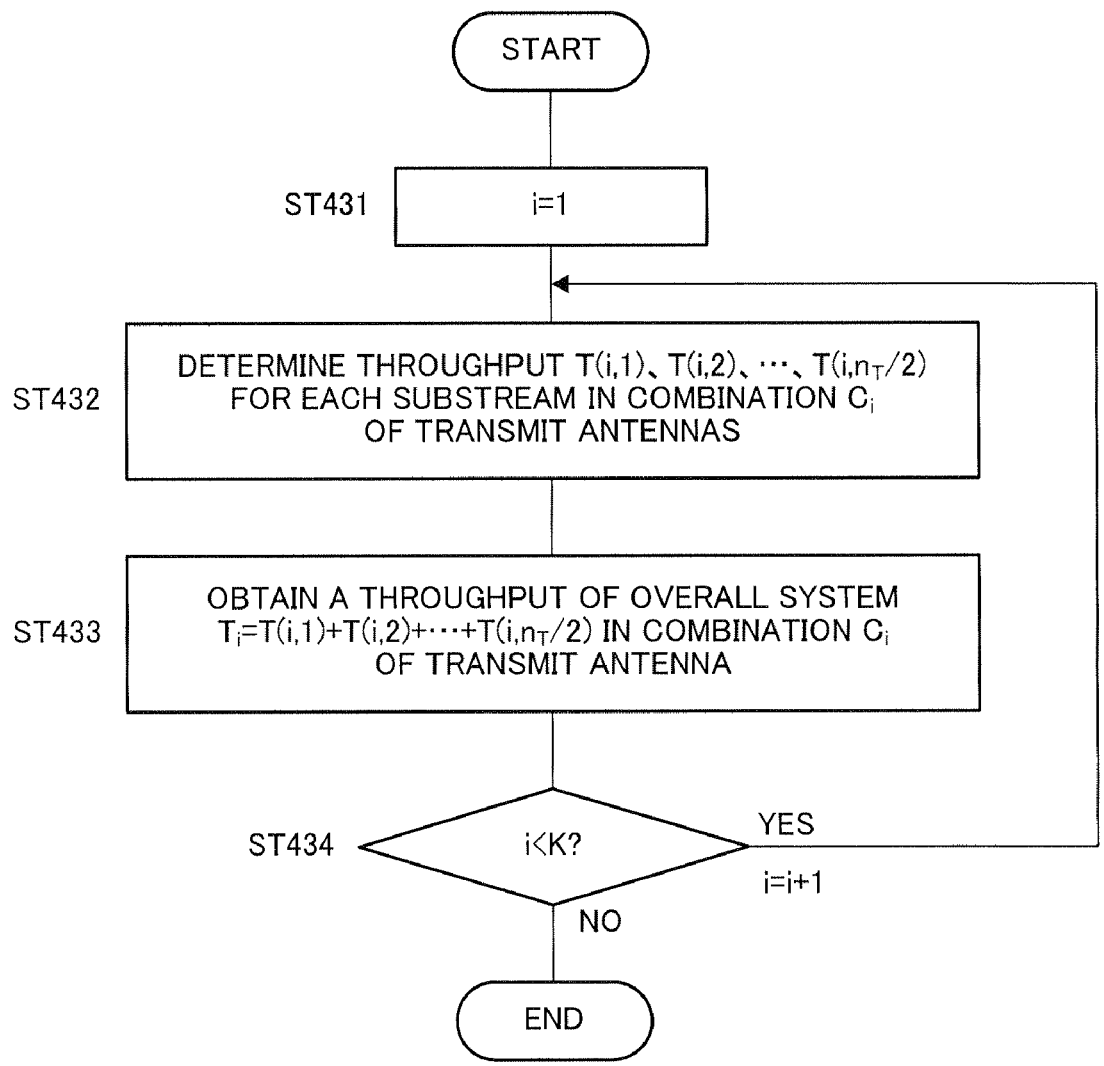
FIG. 5 is a flow chart showing a step of the processing of obtaining a throughput of the overall system according to Embodiment 2 of the present invention.

FIG. 5 is a flow chart showing the step of the processing of determining a throughput of the overall system. This figure shows detailed steps of ST403 in the flow chart shown in FIG. 3.

First, in ST431, antenna selective parameter determining section 202 sets i=1 as an initial condition of the processing of determining the throughput of the overall system. Here, i represents a combination number of transmitting antennas.

Next, in ST432, antenna selective parameter determining section 202 determines throughputs T (i, 1), T (i, 2), . . . , T (i, $n_T/2$) of each substream for combination $C_i$ of transmit antennas. Here, first element "i" (i=1, 2, . . . , K) of T(i,j) represents a combination number of transmit antennas, and second element "j" (j=1, 2, . . . , $n_T/2$) represents each substream. For example, throughputs T(1,1), T(1,2), . . . , T(1, $n_T/2$) of substreams $S_1, S_2, \ldots, S_{n_T/2}$ for combination $C_1$ are determined. The method for obtaining T (1,j) (j=1, 2, . . . $n_T/2$), for example, T (1, 1), includes determining, with reference to the table in FIG. 4, rank M, for example, M=3 that satisfies a predetermined BER or FER condition and maximizes the throughput, based on the SINR (1, 1) obtained in ST402 shown in the flow chart of FIG. 3, and obtaining the corresponding throughput as T (1, 1)=1.5.

Next, in ST433, antenna selective parameter determining section 202 obtains the sum total of throughput of each substream obtained in ST432, that is, the overall system throughput $T_i=T(i, 1)+T(i, 2)+ \ldots +T(i, n_T/2)$ for combination $C_i$ of transmitting antennas. For example, in ST431, antenna selective parameter determining section 202 obtains throughput $T_1=T(1, 1)+T(1, 2)+ \ldots +T(1, n_T/2)$ of the overall system in determined combination $C_1$.

Next, in ST434, antenna selective parameter determining section 202 determines whether or not i<K. When i<K, i is incremented, the flow returns to ST432, and the sum total of throughput $T_i$ (i=1, 2, . . . , K) of each substream in all combinations of transmit antennas is obtained by repeating ST432 and ST433. On the other hand, when i<K does not hold (that is, when i reaches M), the processing ends and the flow moves to ST404 shown in the flow chart of FIG. 3.

Next, in ST404 shown in the flow chart of FIG. 3, antenna selective parameter determining section 202 selects i that maximizes the value of $T_i$ (here i=1, 2, . . . K), and determines i as antenna selective parameter C.

In this way, it is possible to improve the spectrum efficiency of the system by selecting a combination of antennas that maximizes the throughput of the overall system.

Although, as in this embodiment, AMC parameter determining section 107 may determine AMC parameter M using the SINR-after-STTD-decoding of each substream in all combinations of transmit antennas, AMC parameter determining section 107 may determine ranks $M_1, M_2, \ldots, M_{n_T/2}$ corresponding to each substream by using the method in ST432 of FIG. 4 for the specific combination of transmit antennas corresponding to antenna selective parameter C determined by antenna selective parameter determining section 202. In this case, the sum total of throughput of each substream corresponding to these determined ranks $M_1, M_2, \ldots, M_{n_T/2}$ coincides with a maximum value of $T_i$ selected by antenna selective parameter determining section 202 in ST404 shown in FIG. 4.

The embodiments of the present invention have been described.

Figure 6:
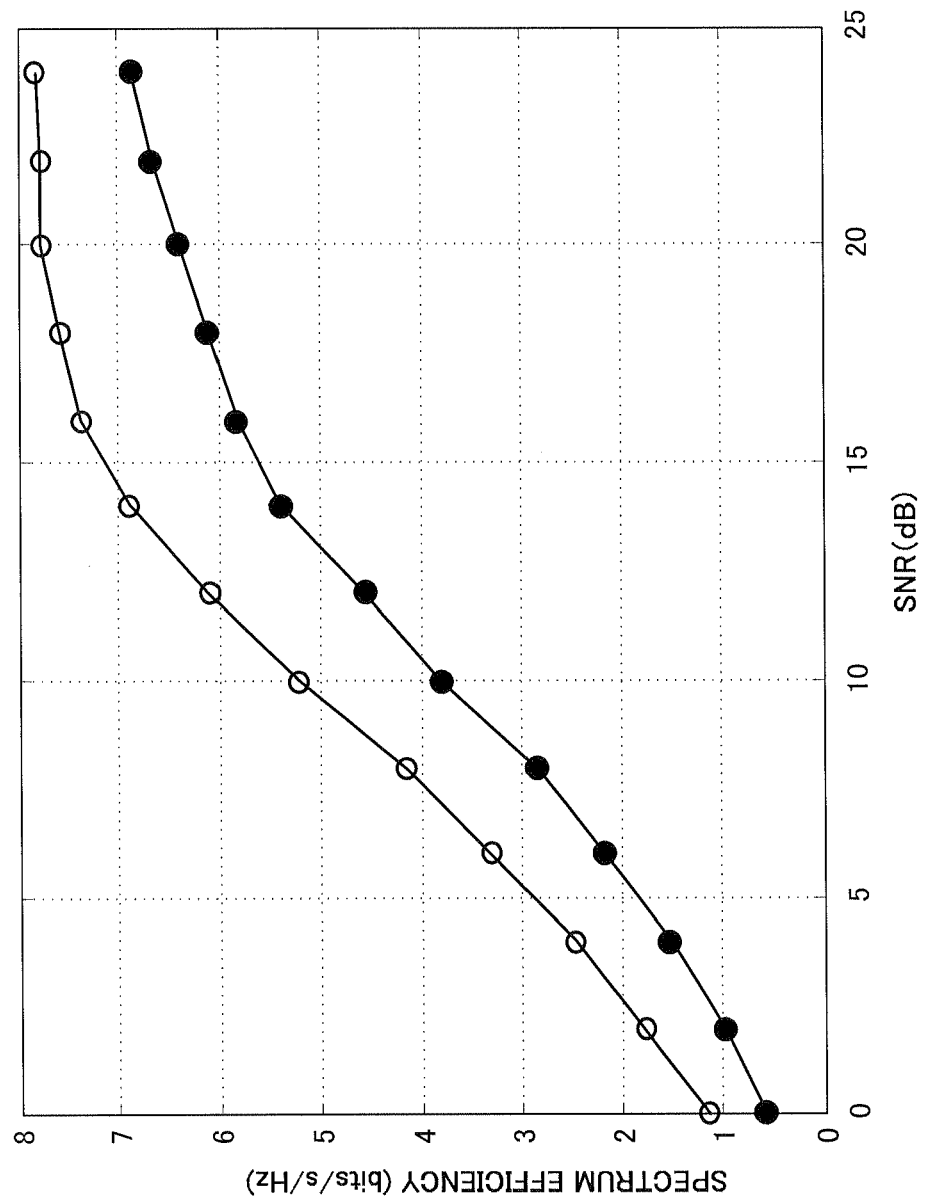
FIG. 6 shows a comparison of the radio communication system performance when the present invention is applied and when not applied.

FIG. 6 shows a comparison of the radio communication system performance when the present invention is applied and when not applied. This system performs communication using four transmit antennas and two receive antennas, and utilizes a flat fading channel as the communication channel. The modulation schemes include BPSK, QPSK, 8 PSK and 16 QAM, and an upper limit of BER is $10^{-3}$. In this figure, the horizontal axis shows an SNR (Signal to Noise Ratio), and the vertical axis shows spectrum efficiency corresponding to the system performance. White circles show the spectrum efficiency when the present invention is applied, and black circles show the spectrum efficiency when the present invention is not applied. As FIG. 6 shows, the present invention can improve the radio communication system performance.

The radio communication system, radio transmitting apparatus, radio receiving apparatus and radio communication method according to the present invention are not limited to the above embodiments and can be modified and implemented in various ways.

The radio transmitting apparatus and the radio receiving apparatus according to the present invention can be implemented in a communication terminal apparatus and a base station apparatus in a mobile communication system based on a MIMO scheme so that it is possible to provide a communication terminal apparatus, base station apparatus and mobile communication system having the same operation and effects as those described above.

Furthermore, here, a case has been described as an example where the present invention is configured by hardware. However, the present invention can also be realized by software. For example, it is possible to realize same functions as those of the radio transmitting apparatus and the radio receiving apparatus according to the present invention by describing an algorithm of the method for selecting a combination of transmitting antennas according to the present invention in a programming language, storing this program in a memory and executing this program by an information processing section.

An aspect of the present invention provides a radio communication method of a radio communication system that performs communication using a plurality of antennas, wherein: the receiving side of the radio communication system executes the steps of: estimating a channel and calculating a signal to interference and noise ratio-after space-time transmit diversity decoding for each substream in all combinations of transmit antennas; calculating a parameter of overall transmission performance in all combinations of the transmit antennas based on a signal to interference and noise ratio for each substream in all combinations of the transmit antennas, and obtaining an antenna selective parameter by selecting a combination of transmit antennas from among all combinations of the transmit antennas that optimizes the parameter of overall transmission performance as a combination selected for the time being; selecting an adaptive modulation and coding parameter for each substream based on the signal to interference and noise ratio-after-space-time-transmit-diversity decoding for each substream, obtained through calculations in the selected combination; and feeding back the antenna selective parameter and the selected adaptive modulation and coding parameter to the transmitting side using a feedback channel, and the transmitting side of the radio communication system executes the steps of: performing adaptive modulation and encoding of transmit data based on the adaptive modulation and coding parameter fed back from the receiving side; and performing space-time transmit diversity encoding, selecting a combination of antennas based on the antenna selective parameter fed back from the receiving side and transmitting the transmit data using the selected combination of antennas.

Another aspect of the present invention provides a configuration in the above described aspect, wherein the receiving side further executes a step of performing space-time transmit diversity decoding processing and adaptive demodulation and decoding processing based on previously stored adaptive modulation and coding parameters and the antenna selective parameter, and obtaining original transmit data.

A further aspect of the present invention provides a configuration in the above described aspect, wherein the parameter of the overall transmission performance is an overall communication capacity of the radio communication system.

A still further aspect of the present invention provides a configuration in the above described aspect, wherein the overall communication capacity of the radio communication system is calculated using the signal to interference and noise ratios in all combinations of the transmit antennas, according to Shannon's formula.

A still further aspect of the present invention provides a configuration in the above described aspect, wherein the parameter of the overall transmission performance is an actual throughput of adaptive modulation and coding.

A still further aspect of the present invention provides a configuration in the above described aspect, wherein the actual throughput of the adaptive modulation and coding is the sum total of throughputs corresponding to the adaptive modulation and coding parameter.

A still further aspect of the present invention provides a configuration in the above described aspect, wherein adaptive modulation and coding, space-time transmit diversity and selection of a combination of antennas performed on the transmitting side are performed according to a scheme in which one substream corresponds to two or more fixed transmit antennas.

A still further aspect of the present invention provides a radio receiving apparatus of a radio communication system that performs communication using a plurality of antennas, comprising: a channel estimating section that performs channel estimation; an antenna selective parameter determining section that calculates the signal to interference and noise ratio-after-space-time-transmit-diversity-decoding for each substream in all combinations of transmit antennas based on an output from the estimating section, calculates a parameter of overall transmission performance in all combinations of the transmit antennas based on the signal to interference and noise ratio for each substream in all combinations of the transmit antennas, obtains a combination of transmit antennas from among all combinations of the transmit antennas that optimizes the parameter of overall transmission performance as a combination selected for the time being, outputs antenna selective parameter and the signal to interference and noise ratio-after-space-time-transmit-diversity-decoding calculated for each substream for the selected antenna combination, and feeds back the antenna selective parameter to the transmitting side; an adaptive modulation and coding parameter selecting section that selects an adaptive modulation and coding parameter for each substream based on signal to interference and noise ratio-after space-time-transmit-diversity-decoding for each substream calculated for the selected antenna combination received from the antenna selective parameter determining section and feeds back the selected adaptive modulation and coding parameter to the transmitting side; and a multi-input multi-output detecting section that performs space-time transmit diversity decoding processing and adaptive demodulation and decoding processing based on previously stored adaptive modulation and coding parameters and the antenna selective parameter and obtains original data.

A still further aspect of the present invention provides a configuration in the above described aspect, wherein the parameter for the overall transmission performance is an overall communication capacity of the radio communication system.

A still further aspect of the present invention provides a configuration in the above described aspect, wherein the overall communication capacity of the radio communication system is calculated using the signal to interference and noise ratio in all combinations of the transmit antennas, according to Shannon's formula.

A still further aspect of the present invention provides a configuration in the above described aspect, wherein the parameter of the overall transmission performance is an actual throughput of adaptive modulation and coding.

A still further aspect of the present invention provides a configuration in the above described aspect, wherein the actual throughput of the adaptive modulation and coding is the sum total of the throughputs corresponding to the adaptive modulation and coding parameter.

A still further aspect of the present invention provides a radio transmitting apparatus of a radio communication system that performs communication using a plurality of antennas, comprising: an adaptive modulation and coding section that performs adaptive modulation and coding on data based on an adaptive modulation and coding parameter feedback from a receiving side; a space-time transmit diversity coding section that performs space-time transmit diversity coding; and an antenna selecting section that selects a combination of antennas based on an antenna selective parameter provided in the feedback from the receiving side, and transmits the data using the selected combination of antennas.

A still further aspect of the present invention provides a configuration in the above described aspect, wherein the adaptive modulation and coding, the space-time transmit diversity and selection of antenna combination performed on the transmitting side are performed according to a scheme in which one substream corresponds to two or more fixed transmitting antennas.

The present application is based on Chinese Patent Application No. 200510004365.2, filed on Jan. 13, 2005, entire content of which is expressly incorporated by reference herein.

INDUSTRIAL APPLICABILITY

The radio communication system, radio transmitting apparatus, radio receiving apparatus and radio communication method according to the present invention can be applied for use in, for example, a radio communication system for performing communication using a plurality of antennas.

The invention claimed is:

1. A radio communication system comprising a radio transmitting apparatus that transmits a plurality of substreams using a plurality of transmission antennas and a radio receiving apparatus that receives the plurality of substreams using a plurality of reception antennas, wherein:

the radio receiving apparatus comprises:
a channel estimation section that performs channel estimation using the plurality of substreams and generates a channel estimation matrix;
a system performance calculation section that calculates an overall performance of the radio communication system, the overall performance of the radio communication system being calculated in each combination of the plurality of transmission antennas using the channel estimation matrix;
a specific combination determining section that determines a specific combination of the transmission antennas that optimizes the overall performance of the radio communication system; and
a reporting section that reports information about the specific combination to the radio transmitting apparatus; and the radio transmitting apparatus comprises:
an antenna selection section that selects the transmission antennas to use in transmission according to the specific combination reported from the radio receiving apparatus; and
a transmitting section that transmits another plurality of substreams using the selected transmission antennas.

2. A radio receiving apparatus comprising:
a receiving section that receives a plurality of substreams transmitted from a radio transmitting apparatus, the plurality of substreams being received using a plurality of reception antennas;
a channel estimation section that performs channel estimation using the plurality of substreams and generates a channel estimation matrix;
a system performance calculation section that calculates an overall performance of a radio communication system, the overall performance of the radio communication system being calculated in each combination of a plurality of transmission antennas of the radio transmitting apparatus using the channel estimation matrix;
a determining section that determines a specific combination of transmission antennas that optimizes the overall performance of the radio communication system; and
a reporting section that reports information about the specific combination to the radio transmitting apparatus.

3. The radio receiving apparatus according to claim 2, wherein the system performance calculation section calculates an overall communication capacity of the radio communication system as the overall performance of the radio communication system.

4. The radio receiving apparatus according to claim 2, wherein the system performance calculation section calculates an overall throughput of the radio communication system as the overall performance of the radio communication system.

5. The radio receiving apparatus according to claim 3, further comprising a signal to interference and noise ratio calculation section that calculates a signal to interference and noise ratio value for each of the plurality of substreams, the signal to interference and noise ratio values being calculated in each combination of the transmission antennas, wherein the system performance calculation section calculates the overall communication capacity of the radio communication system, using the signal to interference and noise ratio value for each of the plurality of substreams, in each combination of the transmission antennas, according to a Shannon's formula represented by:

$$R_i = \sum_{j=1}^{n_T/2} \log_2(1 + \text{SINR}(i, j)) \quad i = 1, 2, \ldots, K$$

where i is a combination number of the transmission antennas, j is a stream number, K is the number of all combinations of the transmission antennas, $R_i$ is the overall communication capacity, $n_T$ is the number of the transmission antennas of the radio transmitting apparatus, and SINR is the signal to interference and noise ratio value.

6. The radio receiving apparatus according to claim 5, further comprising:
a detection section that detects a first signal to interference and noise ratio vector in a first combination of the plurality of transmission antennas corresponding to the channel estimation matrix, the first signal to interference and noise ratio vector comprising a signal to interference and noise ratio for each of the plurality of substreams;
a column transformation calculation section that calculates a column transformation matrix that allows the channel estimation matrix to transform into a channel matrix corresponding to a second combination of the plurality of transmission antennas, the second combination of the transmission antennas being different from the first combination of the transmission antennas; and
a column transformation execution section that executes a column transformation of the first signal to interference and noise ratio vector using the column transformation matrix, and calculates signal to interference and noise ratio values of the plurality of substreams in the second combination of the transmission antennas,
wherein the signal to interference and noise ratio calculation section calculates the signal to interference and noise ratio value, for each of the plurality of substreams, in each combination of the transmission antennas by repeated processing at the column transformation calculation section and the column transformation execution section.

7. The radio receiving apparatus according to claim 4, further comprising a throughput calculation section that calculates a throughput for each of the plurality of substreams, the throughput being calculated in each combination of the transmission antennas,
wherein the system performance calculation section calculates a sum total of throughputs of the plurality of substreams as the overall throughput of the radio communication system.

8. The radio receiving apparatus according to claim 7, further comprising an adaptive modulation and coding parameter determining section that determines an adaptive modulation and coding parameter for each of the plurality of substreams, the adaptive modulation and coding parameter being determined in each combination of the transmission antennas based on the channel estimation matrix, wherein:
the adaptive modulation and coding parameter determining section determines, for each substream, the adaptive modulation and coding parameter that maintains a reception quality determined by a bit error rate or a frame error rate at a predetermined level, and maximizes the throughput; and
the throughput calculation section determines a maximum throughput corresponding to the adaptive modulation and coding parameter for each substream as the throughput for each of the plurality of substreams used in calculating the overall throughput of the radio communication system.

9. The radio receiving apparatus according to claim 8, further comprising a decoding section that performs space time transmit diversity decoding processing and adaptive demodulation and decoding processing, based on previously stored adaptive modulation and coding parameters and the specific combination of the plurality of transmission antennas, and obtains original transmission data.

10. A radio transmitting apparatus that transmits the plurality of substreams to the radio receiving apparatus according to claim 2, the radio transmitting apparatus comprising:
a transmitting section that transmits the plurality of substreams using a plurality of transmission antennas; and
an antenna selection section that selects the transmission antennas to use in transmission, the transmission antennas being selected according to the specific combination of the transmission antennas reported from the radio receiving apparatus,
wherein the transmitting section transmits the plurality of substreams using the transmission antennas selected from the plurality of transmission antennas.

11. The radio transmitting apparatus according to claim 10, further comprising:
an adaptive modulation and coding section that performs adaptive modulation and coding on the plurality of substreams based on an adaptive modulation and coding parameter fedback from the radio receiving apparatus; and
a space time transmit diversity coding section that performs space time transmit diversity coding on the plurality of substreams.

12. The radio transmitting apparatus according to claim 11, wherein the adaptive modulation and coding, the space time transmit diversity coding and the selection at the antenna selection section are performed according to a scheme in which one substream corresponds to two or more fixed transmission antennas.

13. A radio communication method in a radio communication system comprising a radio transmitting apparatus that transmits a plurality of substreams using a plurality of transmission antennas and a radio receiving apparatus that receives the plurality of substreams using a plurality of reception antennas, the radio communication method comprising:
at the radio receiving apparatus:
performing channel estimation using the plurality of substreams and generating a channel estimation matrix;
calculating an overall performance of the radio communication system, in each combination of the plurality of transmission antennas, using the channel estimation matrix;
determining a specific combination of the transmission antennas that optimizes the overall performance of the radio communication system;
reporting information about the specific combination to the radio transmitting apparatus; and
at the radio transmitting apparatus:
selecting the transmission antennas to use in transmission, the transmission antennas being selected according to the specific combination reported from the radio receiving apparatus; and
transmitting another plurality of substreams using the selected transmission antennas.

14. The radio communication method according to claim 13, further comprising:
at the radio receiving apparatus:
calculating a signal to interference and noise ratio, the signal to interference and noise ratio being calculated, in each combination of the transmission antennas, after space time transmit diversity decoding for each of the plurality of substreams; and
selecting an adaptive modulation and coding parameter for each substream based on the signal to interference and noise ratio for each substream in the selected specific combination, wherein:

the calculation of the overall performance of the radio communication system comprises calculating the overall performance of the radio communication system for each combination of the plurality of transmission antennas based on the signal to interference and noise ratio of each substream after space time transmit diversity decoding for each substream in each combination of the transmission antennas;

the reporting of the information about the specific combination to the radio transmitting apparatus comprises reporting the selected adaptive modulation and coding parameter using a feedback channel; and at the radio transmitting apparatus:

performing adaptive modulation and coding on transmission data based on the adaptive modulation and coding parameter reported from the radio receiving apparatus; and performing space time transmit diversity coding on the transmission data.

* * * * *